US012587239B2

(12) United States Patent     (10) Patent No.:   US 12,587,239 B2
Dai et al.                 (45) Date of Patent:     Mar. 24, 2026

(54) SYSTEMS AND METHODS USING REFLECTION-BASED COMMUNICATION ELEMENTS

(71) Applicant: ZTE Corporation, Shenzhen (CN)

(72) Inventors: Qian Dai, Shenzhen (CN); Ping Li, Shenzhen (CN); Yiming Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 31 days.

(21) Appl. No.: 18/786,282

(22) Filed: Jul. 26, 2024

(65) Prior Publication Data

US 2024/0388329 A1     Nov. 21, 2024

Related U.S. Application Data

(63) Continuation of application No. PCT/CN2022/074920, filed on Jan. 29, 2022.

(51) Int. Cl.
| | |
|---|---|
| *H04B 7/04* | (2017.01) |
| *H04W 28/20* | (2009.01) |
| *H04W 72/0453* | (2023.01) |

(52) U.S. Cl.
CPC ........ *H04B 7/04026* (2023.05); *H04W 28/20* (2013.01); *H04W 72/0453* (2013.01)

(58) Field of Classification Search
CPC .............. H04W 28/20; H04W 72/0453; H04B 7/04026
See application file for complete search history.

(56) References Cited

U.S. PATENT DOCUMENTS

| | | | |
|---|---|---|---|
| 2015/0319802 A1 | 11/2015 | Lindoff et al. | |
| 2020/0154488 A1 | 5/2020 | Zhang et al. | |
| 2023/0208486 A1* | 6/2023 | Dai ................... | H04B 7/04013 |
| | | | 370/315 |

FOREIGN PATENT DOCUMENTS

| | | |
|---|---|---|
| CN | 111181615 A | 5/2020 |
| WO | WO-2018/169462 A | 9/2018 |
| WO | WO-2021/239259 A1 | 12/2021 |

OTHER PUBLICATIONS

Extended European Search Report for EP Appl. No. 22922856.4, dated Jan. 28, 2025 (13 pages).
China Unicom, "Email discussion summary for [RAN-R18-WS-crossFunc-China_Unicom]," 3GPP TSG RAN adhoc_2021_06_RAN_Rel18_WS RWS-210613, Retrieved on Jun. 29, 2021, (15 pages).
Ericsson, "Resuming SCG in RRC Resume.," 3GPP TSG RAN WG3 #106 R3-197351, Retrieved on Nov. 8, 2019, (3 pages).

(Continued)

*Primary Examiner* — Rahel Guarino
(74) *Attorney, Agent, or Firm* — Foley & Lardner LLP

(57) ABSTRACT
Embodiments of a system, device and method for suspending sharing of a reflection-based communication element. In some aspects, a wireless communication method includes sending, by a first wireless communication node to a second wireless communication node, a first message to suspend sharing of a reflection-based communication element between the first wireless communication node and the second wireless communication node, wherein the reflection-based communication element keeps sharing configuration parameters from the first wireless communication node and the second wireless communication node.

19 Claims, 8 Drawing Sheets

700

710  ⌐ Send, by a first wireless communication node to a second wireless communication node, a first message to suspend sharing of a reflection-based communication element between the first wireless communication node and the second wireless communication node 720  ⌐ Wherein the reflection-based communication element keeps sharing configuration parameters from the first wireless communication node and the second wireless communication node

(56) References Cited

OTHER PUBLICATIONS

Japanese Notice of Reasons for Rejection on JP Appl. No. 2024-544713 dated Jul. 2, 2025 (12 pages).
International Search Report and Written Opinion for PCT Appl. No. PCT/CN2022/074920 mailed Oct. 20, 2022 (7 pages).
ZTE et al., "Support of Reconfigurable Intelligent Surface for 5G Advanced", 3GPP TSG RAN Rel-18 workshop, RP-210465, Electronic Meeting, Jul. 2, 2021 (8 pages).

* cited by examiner

700

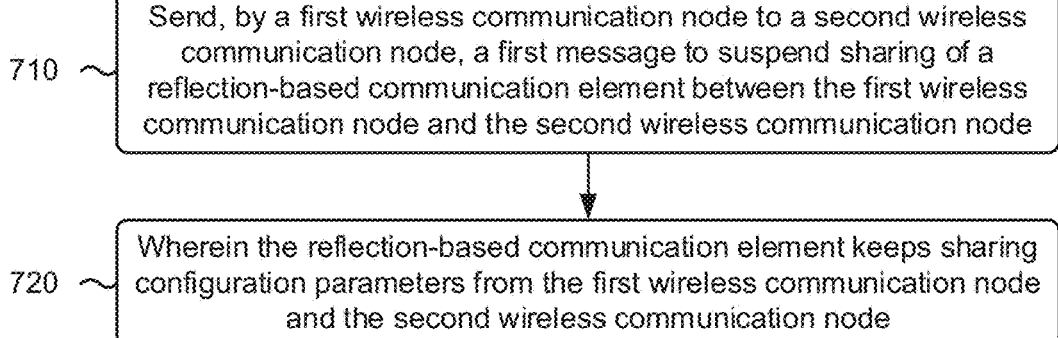

710    Send, by a first wireless communication node to a second wireless communication node, a first message to suspend sharing of a reflection-based communication element between the first wireless communication node and the second wireless communication node 720    Wherein the reflection-based communication element keeps sharing configuration parameters from the first wireless communication node and the second wireless communication node

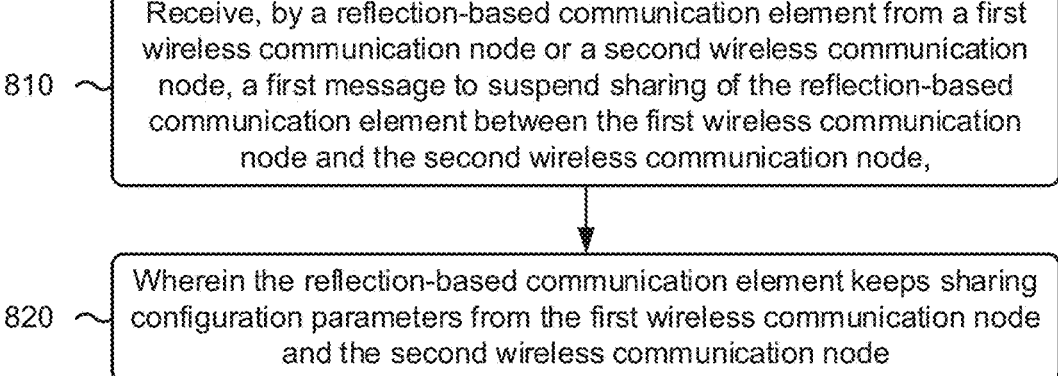

810   Receive, by a reflection-based communication element from a first wireless communication node or a second wireless communication node, a first message to suspend sharing of the reflection-based communication element between the first wireless communication node and the second wireless communication node, 820   Wherein the reflection-based communication element keeps sharing configuration parameters from the first wireless communication node and the second wireless communication node

FIG. 8

SYSTEMS AND METHODS USING REFLECTION-BASED COMMUNICATION ELEMENTS

CROSS-REFERENCE TO RELATED APPLICATION

This application claims the benefit of priority under 35 U.S.C. § 120 as a continuation of PCT Patent Application No. PCT/CN2022/074920, filed on Jan. 29, 2022, the disclosure of which is incorporated herein by reference in its entirety.

TECHNICAL FIELD

The disclosure relates generally to wireless communications and, more particularly, to systems and methods for designing or configuring reference signaling.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based, and some being hardware based, so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

Embodiments of a system, device and method for suspending sharing of a reflection-based communication element. In some aspects, a wireless communication method includes sending, by a first wireless communication node to a second wireless communication node, a first message to suspend sharing of a reflection-based communication element between the first wireless communication node and the second wireless communication node, wherein the reflection-based communication element keeps sharing configuration parameters from the first wireless communication node and the second wireless communication node.

Embodiments of a system, device and method for suspending sharing of a reflection-based communication element. In some aspects, a wireless communication method includes receiving, by a reflection-based communication element from a first wireless communication node or a second wireless communication node, a first message to suspend sharing of the reflection-based communication element between the first wireless communication node and the second wireless communication node. In some embodiments, the reflection-based communication element keeps sharing configuration parameters from the first wireless communication node and the second wireless communication node.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 7 illustrates a method to suspend sharing of the reflection-based communication element, in accordance with some embodiments.

FIG. 8 illustrates a method to suspend sharing of the reflection-based communication element, in accordance with some embodiments.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

A. Network Environment and Computing Environment

Figure 1:
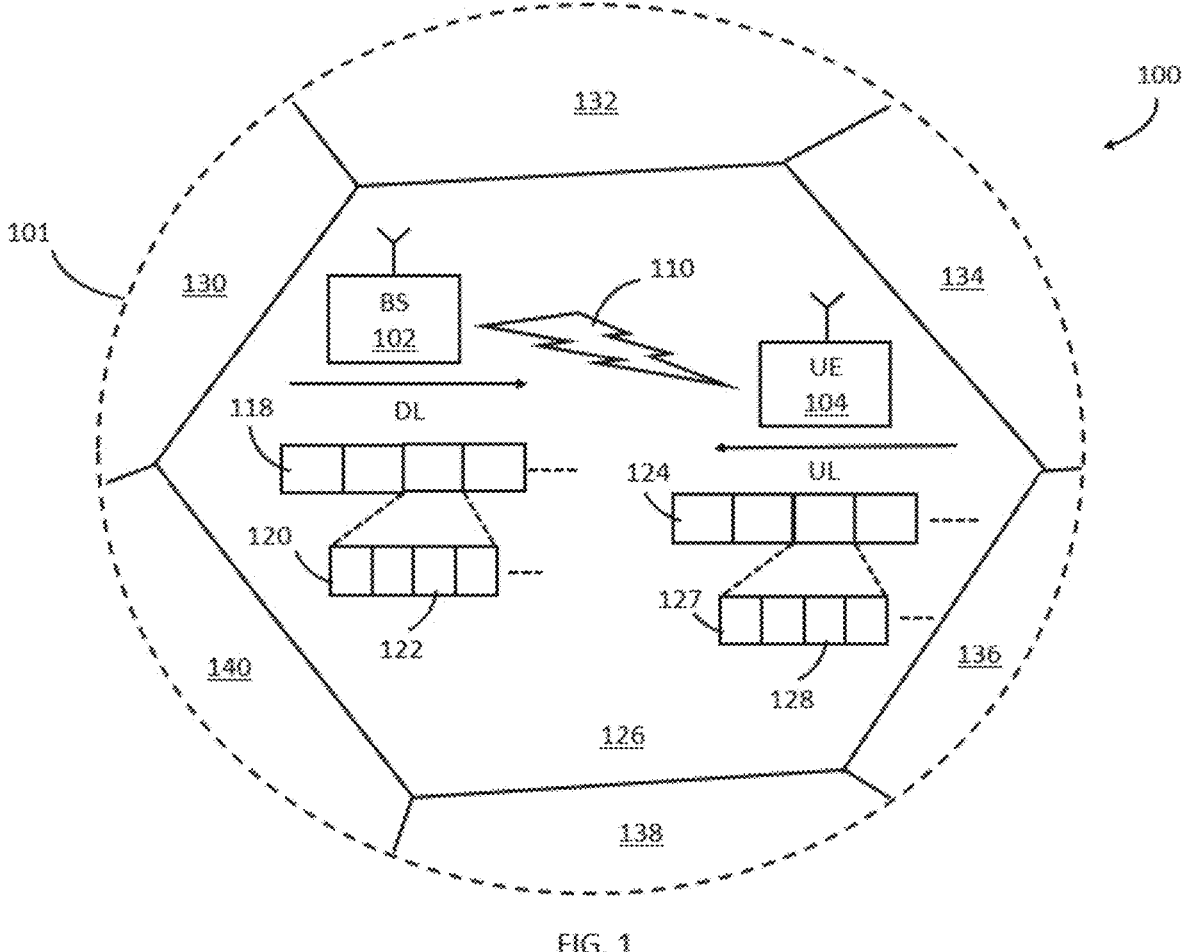
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
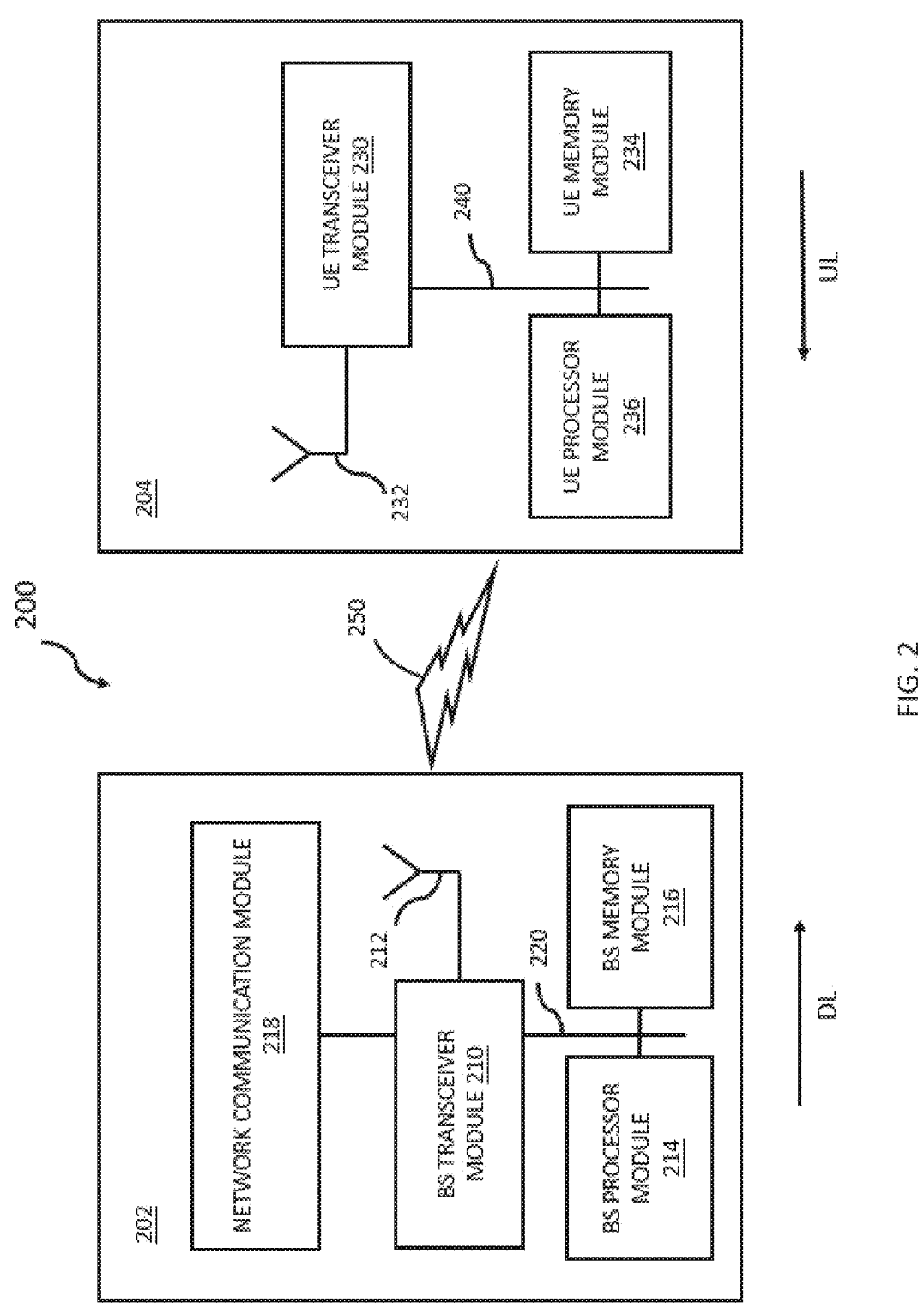
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., OFDM/OFDMA signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

B. Reference Signaling Design and Configuration

A scenario where multiple base stations (BS, e.g., the BS 102, the BS 202, a next generation NodeB (gNB), an evolved NodeB (eNB), a wireless communication node, a cell tower, a 3GPP radio access device, a non-3GPP radio access device, a network node, etc.) share the same RIS (Reconfigurable Intelligent Surface, intelligent reflective surface) is not disclosed in the prior art. Disclosed herein are embodiments of a system, device, and method to negotiate between base stations in this scenario, share RIS methods, processes, interactive parameters, types of RIS and other issues.

With the explosive growth of data traffic, millimeter wave (mmWave) is used in the fifth generation of mobile communications due to the abundance of available frequency bands in mmWave. One challenge to realize millimeter wave communication is path loss. In order to compensate for the serious path loss of millimeter wave transmission, millimeter wave base stations (BS, Base Station) can use large-scale antenna arrays for narrow beam transmission, which can effectively transmit energy directed in a certain area or direction. However, millimeter-wave directional transmission can be sensitive to congestion and can even cause connection interruption, which brings new challenges to the establishment and maintenance of millimeter-wave links. To this end, the Reconfigurable Intelligent Surface (RIS) is integrated into the millimeter wave cellular system.

RIS is an antenna surface that contains a large number of (low-cost) passive reflective elements, in some embodiments. Each element can independently adjust the phase and amplitude of the incident electromagnetic wave, thereby changing the propagation path of the electromagnetic wave. Traditional wireless technology can perform signal processing at the transceiver end to adapt to a dynamic and uncontrollable wireless environment, while RIS can (actively, intelligently, etc.) correct the wireless channel through a controllable intelligent signal reflection technology. Therefore, RIS can provide a new degree of freedom for improvement of wireless link performance and may pave the way for the realization of an intelligent programmable wireless environment. In the millimeter wave cellular system, the congestion problem can severely reduce the communication quality and even cause the link to be interrupted. With its ability to change the electromagnetic wave transmission environment, RIS may become a new method to deal with the problem of millimeter wave communication congestion. For users whose links with the base station are blocked, the phase of RIS can be adjusted to enable a transmission path of electromagnetic waves to bypass obstructions to reach users, thereby improving the communication quality and the coverage of the millimeter wave system.

Some embodiments of a deployment method of RIS adopt the deployment of one or more dedicated RISs in the coverage area of a single base station to improve the signal of coverage blind spots in the coverage area of the base station. However, the blind spots covered by RIS may have a distinction between busy and idle periods. When the RIS is in a non-working state or only uses part of the resources, it can cause the resources to be idle. Therefore, how to fully and efficiently use RIS is a problem that needs to be solved.

Some wireless communication systems may support the use of wireless repeaters. For example, a wireless repeater may be located between a user equipment (UE, e.g., the UE 104, the UE 204, a mobile device, a wireless communication device, a terminal, etc.) and relay the communications between the base station and UE. Repeaters are used to enhance the coverage area of a transmitting device. The repeater may not attempt to decode the signal, but may receive an RF signal over the air, amplify it and re-transmit it. Sometimes the repeater's configuration, e.g., using to control the re-transmitted signal direction and width, can be controlled by the base station to achieve flexible repeater usage. The use case and function of repeater may be similar to RIS. A difference may be that RIS does not amplify the RF signal which can save device cost, and, in some cases, may use larger size reflective panel to ensure the RF signal strength.

Figure 3:
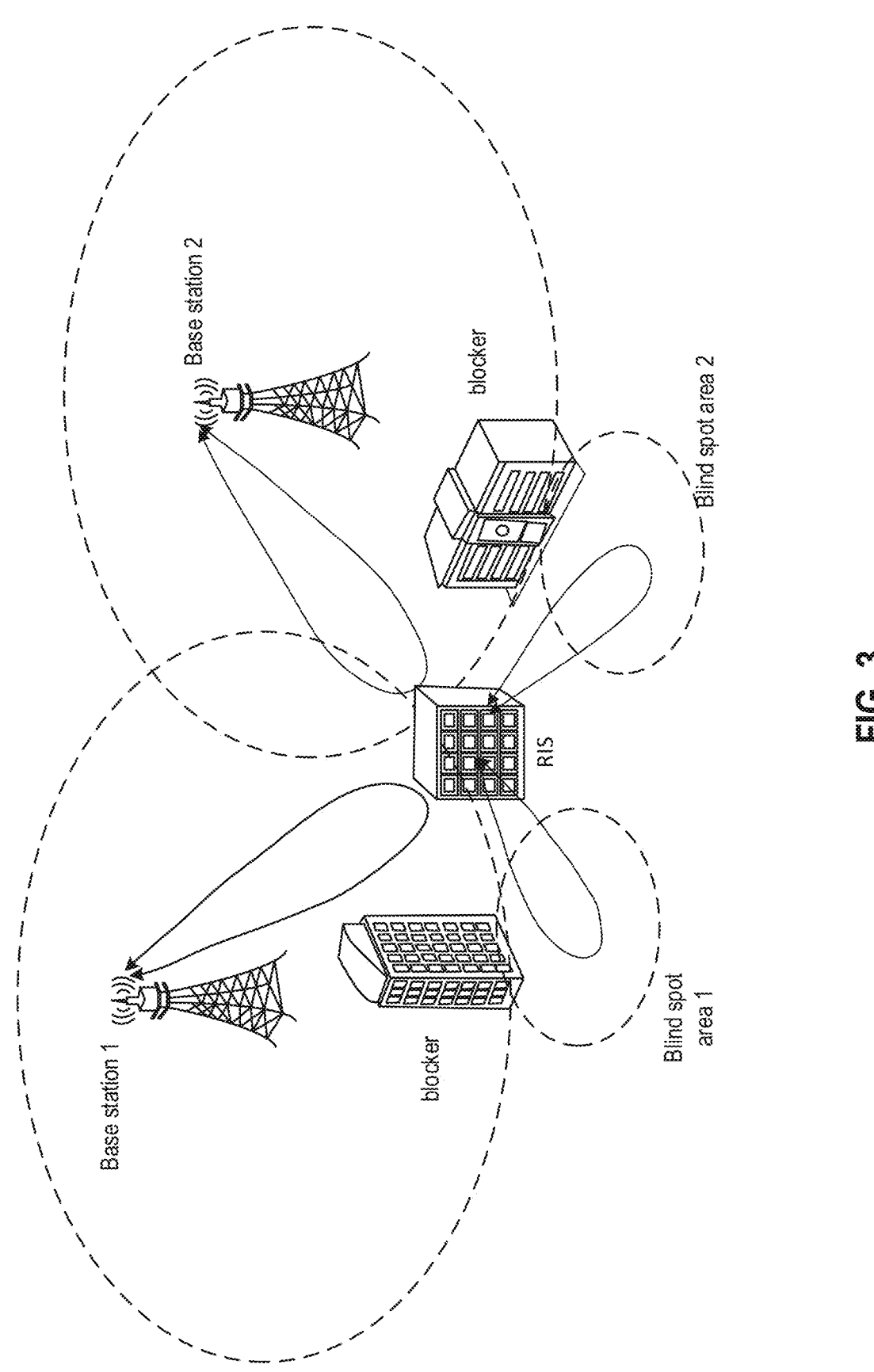
FIG. 3 illustrates a block diagram of exemplary coverage areas of multiple base stations, in accordance with some embodiments of the present disclosure.

Disclosed herein are embodiments of a system, device, and method for how multiple base stations can improve the efficiency of shared use of RIS. FIG. 3 illustrates a block diagram of exemplary coverage areas of multiple base stations, in accordance with some embodiments of the present disclosure. When there are multiple blind spots near the overlapping area of two or more base station coverage areas, RIS can be deployed in the overlapping area, and two or more base stations can share and use the RIS, as shown in FIG. 3.

Since base station 1 (BS1) and base station 2 (BS2) may have different coverage requirements and beam configurations when covering their respective blind spot areas, different base stations such as BS1 and BS2 may use RIS in different ways, resource requirements, and delay requirements.

In some embodiments, a BS acquires RIS sharing capabilities. Communication between neighboring BSs can include: support shared RIS information (RIS type, RIS location, RIS sharing capability (sharing pattern), RIS terminal identification, and RIS user interface working status (on/off)). A neighboring BS can initiate the process of sharing RIS. In some embodiments, during the (initiation) period, the sharing mode is negotiated, the configuration parameters are shared, and during the sharing period, the control module of the RIS establishes a link with which BS. Other auxiliary processes include: modification process of sharing mode, exit process of sharing mode, failure process of sharing mode, and suspended process of sharing mode.

In some embodiments, Base stations 1 and 2 negotiate the configuration parameters for RIS sharing according to the sharing capabilities of RIS and their own requirements for the use of RIS, and perform sharing. In some embodiments, when BS1 or BS2 confirms that there is no need to use RIS for the time being, but do not want to give up the negotiated RIS sharing, BS1 or BS2 can request the RIS sharing suspension from the other party's BS. The RIS sharing suspension may refer to: suspending the shared use of RIS, BS1 and BS2 retain the existing RIS sharing configuration parameters, and RIS retains the RIS sharing configuration parameters corresponding to the suspended BS. During the sharing suspension period, whether the RIS resources originally allocated by the RIS to the sharing suspension BS is used by the BS that has not suspended sharing can be negotiated by BS1 and BS2 before the sharing is suspended. In some embodiments, when the suspended BS requests to resume sharing, the suspended BS requests a RIS sharing resume request to the other BS.

Disclosed herein are embodiments of a suspend process and resume process shared by RIS. When BS1 or BS2 needs to suspend the sharing of the RIS negotiated in advance, BS1 or BS2 can initiate a sharing suspension process to the other party's BS participating in the shared use of the RIS. The suspension may refer to the suspension, but not withdrawal, of the shared use of the RIS.

In one embodiments, BS2 initiates the suspension process. The steps of the suspension process may include: BS2 sending a RIS sharing suspension request to BS1; BS1 feeding back a confirmation message; the BS that currently has established a link with the control module of the RIS sending a RIS sharing suspension message to the RIS; and, according to the received message, RIS saving the original shared configuration parameters, suspending the reflection unit array codebook provided by the shared BS (e.g., BS2), and executing the operations during the shared suspension.

BS2 can send a RIS sharing suspension request to BS1. The suspension sharing request can include one or more: a need to suspend the shared RIS logo; optionally, the reason for the suspension of sharing (changes in own resource requirements, changes in blind spot coverage requirements, RIS coverage performance does not meet the requirements, changes in business requirements); optionally, the time period for suspending sharing (defined by the start time and duration, or the start time and end time); optionally, during the suspension sharing period, whether the RIS resources that are idle due to suspension can be temporarily used by the other party's BS (BS1); or optionally, during the suspended sharing period, which idle RIS resources of BS2 can be temporarily used by the other party's BS (BS1).

The idle (RIS) resources of BS2 that can be temporarily used by the other party's BS can include all idle resources temporarily used by BS1 or part of idle resources temporarily used by BS1. The part of idle resources temporarily used by BS1 can include: if the sharing mode is time sharing, the time period temporarily used by BS1; if the sharing mode is frequency division sharing, information on the frequency band temporarily used by BS1; or, if the sharing mode is space division sharing, the (logo of the) reflective panel information temporarily used by BS1.

BS1 can feed back a confirmation message. The confirmation message (e.g., content) can include one or more of: a confirmation of RIS logo of suspended sharing; a confirmation of time period when sharing is suspended; a confirmation of whether the RIS resources that are idle due to suspension are temporarily used by BS1; or, during the confirmed suspended sharing period, which idle RIS resources are temporarily used by BS1.

The BS that currently has established a link with the control module of the RIS can send a RIS sharing suspension message to the RIS. That is, if BS1 is currently connected to the control module of the RIS, BS1 can send the message; if BS2 is connected to the control module of the RIS, BS2 can send the message to the control module of the RIS; or if both BS1 and BS2 have established a connection with the control module of the RIS at the same time, BS1 or BS2 can send the message. The sharing suspension message can include one or more of: a suspension of the shared BS identity (in this example, it is the identity of BS2); optionally, the reason for suspending sharing; optionally, the time period to suspend sharing; optionally, during the suspension sharing period, whether the RIS resources that are idle due to the suspension are temporarily used by BS1; optionally, which idle RIS resources are temporarily used by BS1 during the suspended sharing period; or, optionally, updated RIS configuration parameters and/or reflection unit array codebook.

According to the received message, RIS can save the original shared configuration parameters, suspend the reflection unit array codebook provided by the shared BS (in this case, BS2), and execute the operations during the shared suspension. The operations executed during the shared execution can include one or more of: RIS maintaining the execution of the existing reflector panel configuration parameters and/or reflector array codebook (RIS resources that are idle due to suspension remain idle); RIS automatically applying the reflective panel configuration parameters and reflective unit array codebook used by the unsuspended RIS resources to the suspended RIS resource; or, if RIS receives the updated RIS shared configuration parameters and/or reflect unit array codebook, the RIS configuring the reflector panel according to the received parameters and codebook.

For a suspended RIS that has been shared, if BS1 or BS2 wants to resume the execution of RIS sharing (e.g., the BS that initiated the suspension or the other BS requests the restoration of RIS sharing), then the restoration process can be initiated.

In one embodiments, BS2 initiates the resuming execution of RIS sharing. The steps for resuming execution of RIS sharing can include: BS2 sending RIS sharing suspension and resume request (e.g., sharing recovery request) to BS1; BS1 feeding back a sharing recovery confirmation message or a sharing recovery rejection message; the BS that currently has established a link with the control module of the RIS sending a RIS sharing recovery message to the RIS; and RIS restoring the saved shared configuration parameters and reflective element array codebook.

BS2 can send RIS sharing suspension and resume request to BS1. The RIS sharing suspension and resume request can include one or more of: an indication that the shared RIS logo needs to be restored or, optionally, the updated shared configuration parameters of the RIS and/or reflection unit array codebook.

BS1 can feed back a sharing recovery confirmation message or a sharing recovery rejection message (optionally, carrying the reason for rejection). The confirmation message can contain one or more of: a confirmation of restoration of shared RIS logo; a confirmation of shared configuration parameters of the RIS and/or reflection unit array codebook provided by BS2; or a modification of the shared configuration parameters and/or reflective element array codebook provided by BS2 and a transmission of the modified shared configuration parameters and/or reflective element array codebook.

The BS that currently has established a link with the control module of the RIS can send a RIS sharing recovery message to the RIS. The RIS sharing recovery message can include one or more of: restoration of the shared BS logo or, optionally, updated shared configuration parameters and/or reflect element array codebook.

RIS can restore the saved shared configuration parameters and reflective element array codebook. If the updated shared configuration parameters and/or reflective element array codebook are received, it can be configured according to the updated shared configuration parameters and/or reflective element array codebook.

Before the RIS sharing is suspended, two network nodes sharing the use of RIS have negotiated to determine sharing related information. The sharing related information can include one or more of: RIS sharing mode; shared configuration parameters of the RIS; or reflective element array codebook configured for RIS. RIS sharing mode can include one or more of: time sharing; frequency division sharing; or air separation sharing. RIS may have multi-reflective panels, and different panels can serve different network nodes.

BS1 and BS2 can exchange the RIS information using the Xn setup process through Xn interface or a newly defined process through Xn interface. The shared related information can be sent by BS1 or BS2 to the control module of RIS, and the sending mode: control plane signaling can be used to carry the information.

The shared configuration parameters can include one or more of: the configuration parameters for time division sharing; the configuration parameters for frequency division sharing; or the configuration parameters for air separation sharing. The configuration parameters for time division sharing can include one or more of: shared time period information or time point or time offset when sharing starts. Shared time period information can indicate that the time period can be periodic, that is, the sharing starts for a period of time every fixed time period, and the parameters include the period, the sharing duration of each period, and the start time offset of the sharing time of each period; the time period can be non-periodic, that is, a time period defined by the start time and end time; the time period can be defined by the start time and duration; or the granularity of the time period can be defined in hours, minutes, seconds, milliseconds, or in system frames, subframes, time slots, and symbols.

The configuration parameters for frequency division sharing can include one or more of: shared frequency band information or RIS reflection unit array corresponding to the shared frequency band (defined by the number of reflection units or the range of the rows and columns of the reflection units).

The configuration parameters for air separation sharing one or more of: number of shared reflective panels; shared reflective panel identification; the configuration mode of the antenna reflection unit array codebook of the shared reflection panel: dynamic, semi-static, static; (optional) supported configuration parameter update time interval; or the physical parameters of the shared reflective panel and the size of the reflective unit array.

Figure 4:
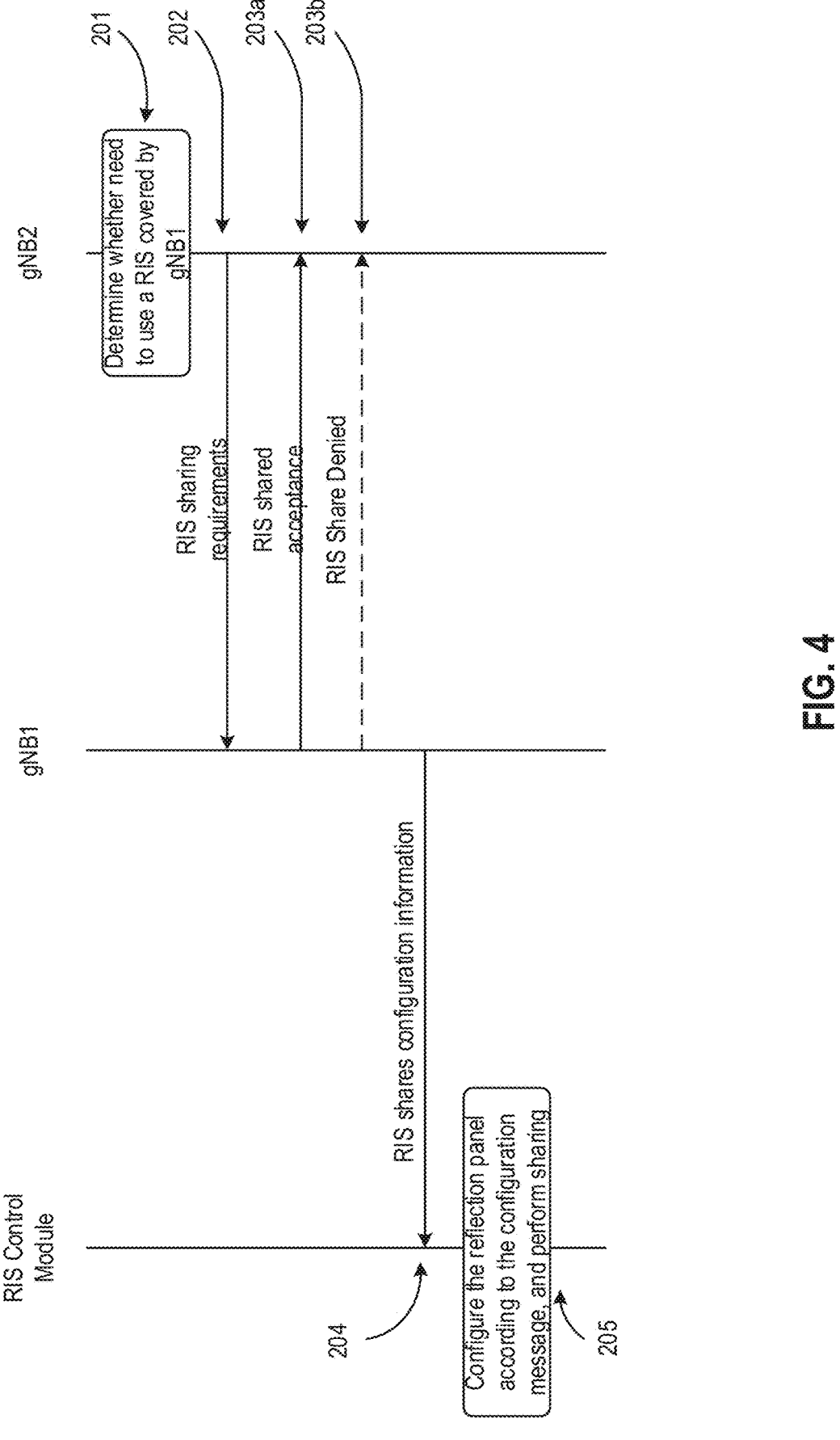
FIG. 4 illustrates a swim lane diagram of an exemplary process for initiating the process of sharing RIS between neighboring base stations, in accordance with some embodiments of the present disclosure.

FIG. 4 illustrates a swim lane diagram of an exemplary process for initiating the process of sharing RIS between neighboring base stations, in accordance with some embodiments of the present disclosure. In one embodiment, a neighboring network node actively requests a neighboring cell node to share RIS, as shown in FIG. 4.

At 201: gNB2 determines whether it needs to use the RIS covered by gNB1 based on the information communicated with gNB1 in advance that can support the sharing of RIS. Based on the conditions for RIS3 to establish a normal connection, gNB2 can evaluate whether there are blind spots around RIS3 that need to be covered, and if so, gNB2 can decide to request to share RIS3.

At 202: gNB2 sends a sharing request to gNB1. The sharing request can include the identity of the RIS that requires sharing: for example, a UE ID of RIS3, the sharing mode of the target RIS: one or more desired sharing modes can be provided, and shared configuration parameters of the target RIS. For example, RIS3 is a multi-panel RIS.

The shared configuration parameters can include the number of reflective panels required to be shared. For example, if gNB1 has informed RIS3 that there are 2 reflective panels in the prior RIS communication, and there is one panel that can be shared, gNB2 can apply for sharing 1 panel.

The shared configuration parameters can include shared reflective panel identification. For example, the serial number of the panel applied for sharing can be used. The shared configuration parameters can include the configuration mode of the antenna reflection unit array of the shared reflection panel: one or more of dynamic, semi-static and static can be selected, and the codebook configuration parameter update interval can also be notified. The shared configuration parameters can include one or more of the physical parameters of the shared reflective panel or the reflecting unit array scale: the size of the reflecting unit array that needs to be used can be expressed by the number of rows and columns.

In some embodiments, RIS3 uses time division sharing. Time division sharing include one or more of: a request to share time period information; the granularity of the time period, which can be defined in hours, minutes, seconds, milliseconds, or in system frames, subframes, time slots, and symbols; or a time point or time offset when sharing starts. Request to share time period information can indicate that the time period can be periodic, that is, the sharing starts for a period of time every fixed time period. The parameters include the period, the sharing duration of each period, and the start time offset of the sharing time of each period; the time period can be aperiodic, that is, a time period defined by start time and end time; or a time period can be defined by start time and duration.

In some embodiments, RIS3 uses frequency division sharing. Frequency division sharing can include frequency band information required to be shared.

The sharing request can include, when gNB2 is using the target RIS, whether the target RIS is connected to gNB1 or gNB2 or to gNB1 and gNB2 at the same time (the RIS control module needs to support at least dual connections). The sharing request can include reflecting unit array codebook configured for the reflective panel (if multiple panels are required to be shared, the corresponding number of reflective unit array codebooks should be provided).

At 203a: gNB1 decides whether to accept the sharing request, if not, go to step 603b; if yes, feedback an acceptance message to gNB2, and confirm or modify the sharing information required by gNB2. The acceptance message can include an indication of acceptance of the identity of one or more target RISs to be shared. In this embodiment, if gNB2's sharing request for RIS3 is accepted, the UE ID of RIS3 can be fed back to indicate confirmation. If gNB2 requires multiple RISs to be shared, and gNB1 refuses to accept some of the sharing requirements of RIS, gNB1 can feed-back the identity of the target RIS that gNB1 refuses to share, with the reason for rejection (for example: the target RIS does not support the sharing mode or sharing required by gNB2, or the configuration parameters and target RIS lack sharable resources);

The acceptance message can include an indication of acceptance of the sharing mode of the shared target RIS. The acceptance message can include an indication of acceptance of the shared configuration parameters of the shared target RIS. The acceptance message can include, when gNB2 is using the target RIS, whether the control module of the target RIS is connected to gNB1 or gNB2 or connected to gNB1 and gNB2 at the same time (the RIS control module is required to support at least dual connections)

At 203b: If gNB1 does not accept the sharing request, gNB1 feeds back a RIS sharing rejection message to gNB2, which may include the reason for the rejection. For example, the reason may include that the target RIS lacks sharable resources, does not support the required sharing mode or sharing configuration parameters.

At 204: If a sharing acceptance message is received, gNB1 sends a sharing configuration message to the RIS that accepts sharing. The sharing configuration message can include the identity of the gNB2 participating in the sharing: such as the cell identity of the base station or the physical cell identity. The sharing configuration message can include one or more of sharing mode; shared configuration parameters; or, when gNB2 is using the target RIS, whether the target RIS is connected to gNB1 or gNB2 or connected to gNB1 and gNB2 at the same time (the RIS control module needs to support at least dual connections). The sharing configuration message can include one or more of, optionally, reflect unit array codebook configured by gNB1 for RIS; or, optionally, reflect element array codebook configured by gNB2 for RIS. At 205: The RIS control plane configures the reflective panel according to the configuration message, and executes sharing.

Figure 5:
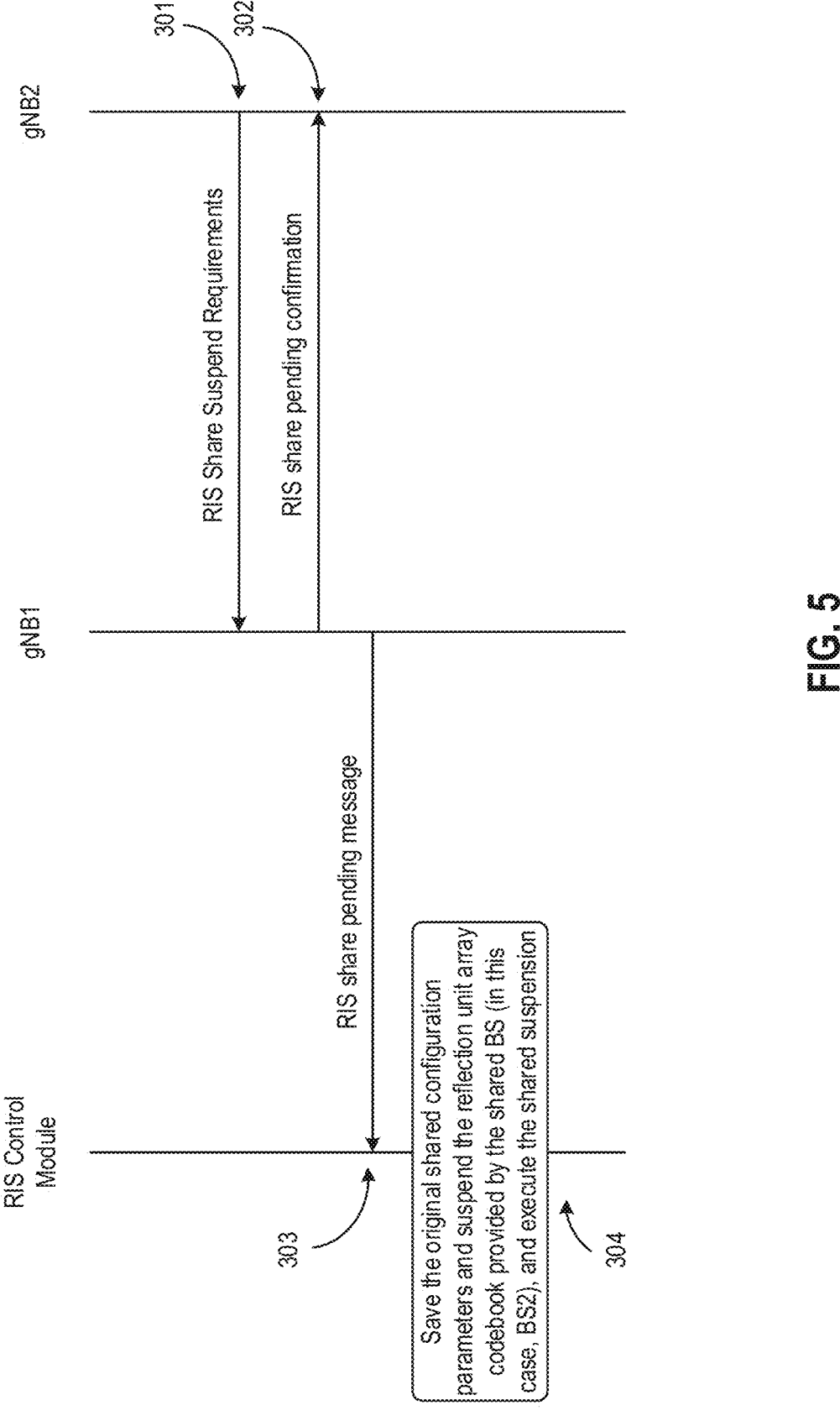
FIG. 5 illustrates a swim lane diagram of another exemplary process for initiating sharing suspension, in accordance with some embodiments of the present disclosure.

FIG. 5 illustrates a swim lane diagram of another exemplary process for initiating sharing suspension, in accordance with some embodiments of the present disclosure. In one embodiment, BS1 and BS2 have established a shared use mechanism for RIS3 covered by BS1. When BS2 has no business temporarily in the RIS3 coverage area, BS2 can consider suspending the shared use of RIS3, as shown in FIG. 5.

At 301: BS2 sends a RIS sharing suspension request to BS1. The sharing suspension request can include including one or more of: an indication of a need to suspend the shared RIS identifier (e.g., the UE ID, IMSI, S-TMSI of RIS3, etc.) which can uniquely identify the RIS by BS1 and BS2; reasons for suspension of sharing (e.g., changes in own resource requirements, changes in blind spot coverage requirements, RIS coverage performance is not up to the requirements, business requirements changes); suspended sharing time period: can be defined by the start time and duration, or the start time and end time; during the suspension sharing period, whether the RIS resources that are idle due to the suspension can be temporarily used by the other party's BS (BS1); or, during the suspended sharing period, which idle RIS resources of BS2 can be temporarily used by the other BS (BS1). Examples of idle RIS resources that can be temporarily used by the other BS are described above.

302: BS1 feeds back a sharing suspension confirmation message. Content of the confirmation message is described above.

303: The BS that currently has established a link with the control module of the RIS sends a RIS sharing suspension message to the RIS. In this example, it is assumed that the RIS is established. In one embodiment, the linked BS is BS1, and BS1 sends the message to RIS. Content of the confirmation message is described above.

304: According to the received message, RIS saves the original shared configuration parameters and the reflection unit array codebook provided by the suspended shared BS (in this case, BS2), and executes the operations during the shared suspension. The operations during shared suspension are described above.

Figure 6:
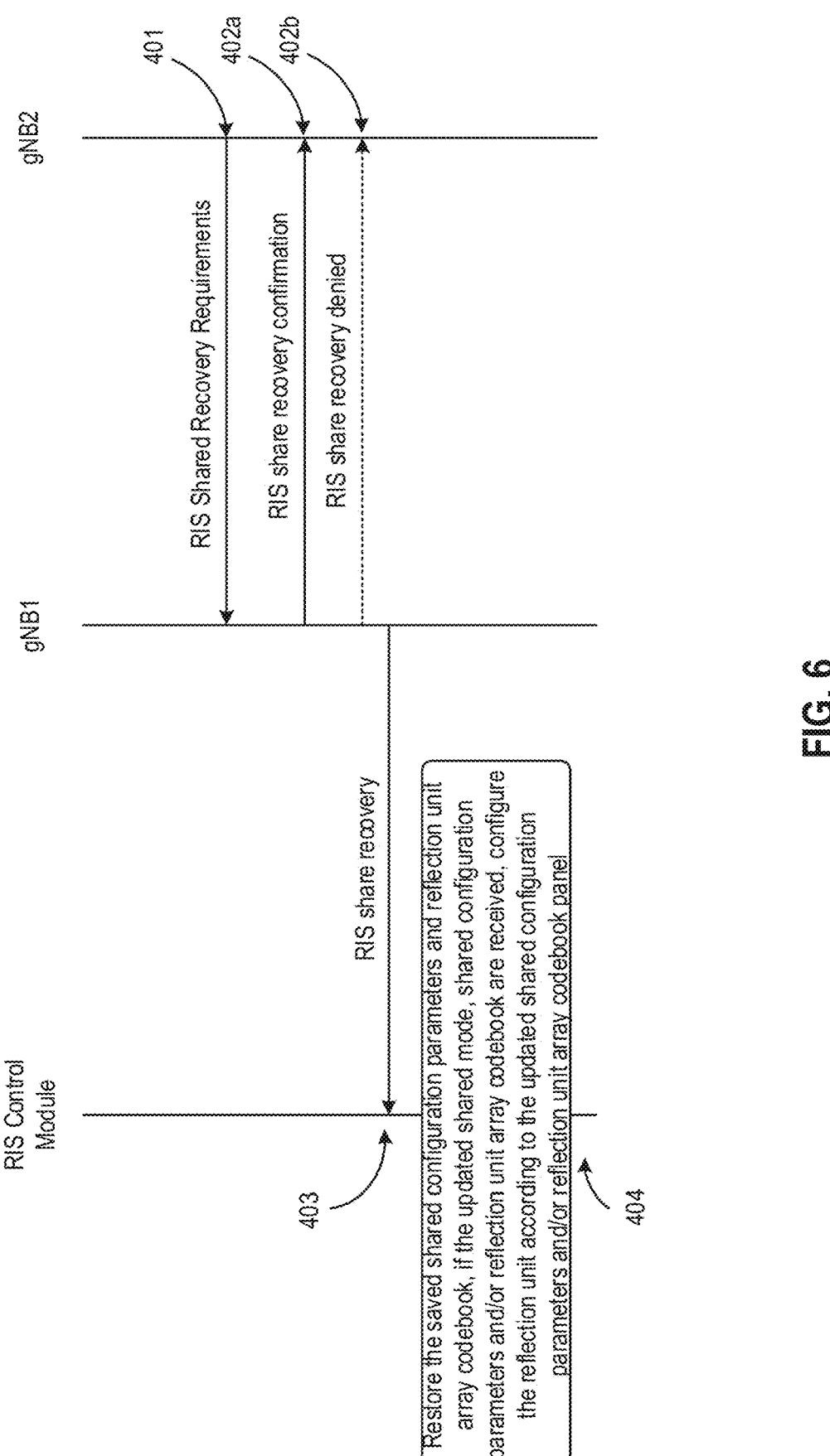
FIG. 6 illustrates a swim lane diagram of an exemplary process for resuming the shared use of RIS, in accordance with some embodiments of the present disclosure.

FIG. 6 illustrates a swim lane diagram of an exemplary process for resuming the shared use of RIS, in accordance with some embodiments of the present disclosure. In one embodiment, when BS2 regenerates the requirement for blind spot coverage within the coverage area of RIS3, BS2 can request BS1 to resume the shared use of RIS3, as shown in FIG. 6.

401: BS2 sends a RIS sharing recovery request to BS1. The content of the sharing recovery request is described above.

402a: BS1 feeds back a sharing recovery confirmation message or a sharing recovery rejection message (optionally, carrying the rejection reason). The content of the confirmation message is described above.

402b: If BS1 determines that the resources of RIS3 are not enough to be shared with BS2 again, (e.g., BS1 has increased resource requirements for RIS3), BS1 can reply to BS2 share recovery rejection message, which can carry the rejection reason. The reasons for rejection are discussed above.

403: The BS that currently has established a link with the control module of the RIS sends a RIS sharing recovery message to the RIS. In this example, assuming that the BS that has established a link with the RIS is BS1, then BS1 sends the message to the RIS, The content of the RIS sharing recovery message is discussed above.

404: RIS restores the saved shared configuration parameters and reflector array codebook. If the shared mode is updated, shared configuration parameters and/or reflector array codebook are received, and the BS is updated in accordance with shared configuration parameters and/or reflector array codebook.

FIG. 7 illustrates a method 700 to suspend sharing of the reflection-based communication element, in accordance with some embodiments. Referring to FIGS. 1-6, the method 700 can be performed by a first wireless communication node (e.g., base station, a gNB), in some embodiments. Additional, fewer, or different operations may be performed in the method 700 depending on the embodiment.

In brief overview, in some embodiments, the first wireless communication node sends, to a second wireless communication node, a first message to suspend sharing of a reflection-based communication element between the first wireless communication node and the second wireless communication node (710), wherein the reflection-based communication element keeps sharing configuration parameters from the first wireless communication node and the second wireless communication node (720).

In more detail, at operation 710, in some embodiments, the first wireless communication node sends, to a second wireless communication node, a first message to suspend sharing of a reflection-based communication element between the first wireless communication node and the second wireless communication node. In some embodiments, the first wireless communication node is BS2 (which can be referred to as gNB2), the second wireless communication node is BS1 (which can be referred to as gNB1), and the reflection-based communication is the RIS control module.

In some embodiments, the first message includes at least one of: an identifier of the reflection-based communication element; a reason for the suspension of sharing the reflection-based communication element; or a time period for the suspension of sharing the reflection-based communication element. In some embodiments, the first message indicates whether resources of the reflection-based communication element that become available due to the suspension of sharing the reflection-based communication element can be used by the second wireless communication node.

In some embodiments, the first message further indicates that the resources of the reflection-based communication element are configured to be partially used by the second wireless communication node. In some embodiments, when a mode to share the reflection-based communication element by the first wireless communication node and the second wireless communication node is time division multiplexing, the first message further indicates a time period temporarily used by the second wireless communication node.

In some embodiments, when a mode to share the reflection-based communication element by the first wireless communication node and the second wireless communication node is frequency division multiplexing, the first message further indicates a frequency band temporarily used by the second wireless communication node. In some embodiments, when a mode to share the reflection-based communication element by the first wireless communication node and the second wireless communication node is space division multiplexing, the first message further indicates information of reflecting panels temporarily used by the second wireless communication node.

In some embodiments, the first wireless communication node receives from the second wireless communication node, a second message acknowledging the first message. In some embodiments, the second message includes at least one of: an identifier of the reflection-based communication element being acknowledged; a time period for the suspension of sharing the reflection-based communication element being acknowledged; acknowledgement of whether resources of the reflection-based communication element that become available due to the suspension of sharing the reflection-based communication element can be used by the second wireless communication node; or which of the resources of the reflection-based communication element being acknowledged is configured to be temporarily used by the second wireless communication node.

In some embodiments, the first or second wireless communication node sends, to the reflection-based communication element, a third message to indicate the suspension of sharing the reflection-based communication element if the second wireless communication node responds acknowledgement to the first message. In some embodiments, the third message includes at least one of: an identifier of the first wireless communication node; a reason for the suspension of sharing the reflection-based communication element; a time period for the suspension of sharing the reflection-based communication element; whether resources of the reflection-based communication element that become available due to the suspension of sharing the reflection-based communication element can be used by the second wireless communication node; which of the resources of the reflection-based communication element is configured to be temporarily used by the second wireless communication node; updated sharing configuration parameters associated with the reflection-based communication element; or an updated codebook configured for a reflecting element array of the reflection-based communication element.

In some embodiments, an original codebook configured for the reflecting element array of the reflection-based communication element remains during the suspension. In some embodiments, after the reflection-based communication element receives a fourth message indicating the suspension of sharing itself, the reflection-based communication element keeps the original codebook that the first wireless communication node configures for a reflecting element array of the reflection-based communication element and the original sharing configuration parameters associated with the reflection-based communication element.

In some embodiments, the first wireless communication node restores the sharing of the reflection-based communication element. In some embodiments, the first wireless communication node sends, to the second wireless communication node, a fifth message indicating the restoration of sharing the reflection-based communication element. In some embodiments, the first wireless communication node receives, from the second wireless communication node, a sixth message acknowledging the fifth message.

In some embodiments, the first wireless communication node or the second wireless communication node sends, to the reflection-based communication element, a seventh message indicating the restoration of sharing the reflection-based communication element. In some embodiments, the seventh message includes at least one of: an identifier of the wireless communication node which resumes sharing the reflection-based communication element; updated sharing configuration parameters associated with the reflection-based communication element; or an updated codebook configured for a reflecting element array of the reflection-based communication element. In some embodiments, the reflection-based communication element resumes the sharing according to the seventh message.

At operation 720, in some embodiments, the reflection-based communication element keeps sharing configuration parameters from the first wireless communication node and the second wireless communication node.

FIG. 8 illustrates a method 800 to suspend sharing of the reflection-based communication element, in accordance with some embodiments. Referring to FIGS. 1-6, the method 800 can be performed by a reflection-based communication element (e.g., RIS control module), in some embodiments. Additional, fewer, or different operations may be performed in the method 800 depending on the embodiment.

In brief overview, in some embodiments, a reflection-based communication element receives, from a first wireless communication node or a second wireless communication node, a first message to suspend sharing of the reflection-based communication element between the first wireless communication node and the second wireless communication node, wherein the reflection-based communication element keeps sharing configuration parameters from the first wireless communication node and the second wireless communication node (810), and the reflection-based communication element keeps sharing configuration parameters from the first wireless communication node and the second wireless communication node (820).

In greater detail, at operation 810, in some embodiments, a reflection-based communication element receives, from a first wireless communication node or a second wireless communication node, a first message to suspend sharing of the reflection-based communication element between the first wireless communication node and the second wireless communication node. In some embodiments, the first wireless communication node is BS2 (which can be referred to as gNB2), the second wireless communication node is BS1 (which can be referred to as gNB1), and the reflection-based communication is the RIS control module.

In some embodiments, the first message includes at least one of: an identifier of the wireless communication node which suspends sharing the reflection-based communication element; a reason for the suspension of sharing the reflection-based communication element; a time period for the suspension of sharing the reflection-based communication element; whether resources of the reflection-based communication element that become available due to the suspension of sharing the reflection-based communication element can be used by the wireless communication node which does not suspend sharing; which of the resources of the reflection-based communication element is configured to be temporarily used by the wireless communication node which does not suspend sharing; updated sharing configuration parameters associated with the reflection-based communication element; or an updated codebook configured for a reflecting element array of the reflection-based communication element.

At operation 820, in some embodiments, the reflection-based communication element keeps sharing configuration parameters from the first wireless communication node and the second wireless communication node. In some embodiments, the reflection-based communication element receives, from the first wireless communication node or the second wireless communication node, a second message to resume the sharing. In some embodiments, the second message includes at least one of: an identifier of the wireless communication node which resumes sharing the reflection-based communication element; updated sharing configuration parameters associated with the reflection-based communication element; or an updated codebook configured for a reflecting element array of the reflection-based communication element.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
sending, by a first wireless communication node to a second wireless communication node, a first message to suspend sharing of a reflection-based communication element between the first wireless communication node and the second wireless communication node, wherein the reflection-based communication element keeps sharing configuration parameters from the first wireless communication node and the second wireless communication node, and wherein the first message indicates whether resources of the reflection-based communication element that become available due to suspension of sharing the reflection-based communication element can be used by the second wireless communication node.

2. The wireless communication method of claim 1, wherein the first message includes at least one of:
an identifier of the reflection-based communication element;
a reason for the suspension of sharing the reflection-based communication element; or
a time period for the suspension of sharing the reflection-based communication element.

3. The wireless communication method of claim 1, wherein the first message further indicates that the resources of the reflection-based communication element are configured to be partially used by the second wireless communication node.

4. The wireless communication method of claim 3, wherein when a mode to share the reflection-based communication element by the first wireless communication node and the second wireless communication node is time division multiplexing, the first message further indicates a time period temporarily used by the second wireless communication node.

5. The wireless communication method of claim 3, wherein when a mode to share the reflection-based communication element by the first wireless communication node and the second wireless communication node is frequency division multiplexing, the first message further indicates a frequency band temporarily used by the second wireless communication node.

6. The wireless communication method of claim 3, wherein when a mode to share the reflection-based communication element by the first wireless communication node and the second wireless communication node is space division multiplexing, the first message further indicates information of reflecting panels temporarily used by the second wireless communication node.

7. The wireless communication method of claim 1, further comprising:
receiving, by the first wireless communication node from the second wireless communication node, a second message acknowledging the first message.

8. The wireless communication method of claim 7, wherein the second message comprises at least one of:
an identifier of the reflection-based communication element being acknowledged;
a time period for the suspension of sharing the reflection-based communication element being acknowledged;
acknowledgement of whether resources of the reflection-based communication element that become available due to the suspension of sharing the reflection-based communication element can be used by the second wireless communication node; or
an indication of which of the resources of the reflection-based communication element being acknowledged is configured to be temporarily used by the second wireless communication node.

9. The wireless communication method of claim 1, further comprising:
sending, by the first or second wireless communication node to the reflection-based communication element, a third message to indicate the suspension of sharing the reflection-based communication element if the second wireless communication node responds acknowledgement to the first message.

10. The wireless communication method of claim 9, wherein the third message includes at least one of:

an identifier of the first wireless communication node;

a reason for the suspension of sharing the reflection-based communication element;

a time period for the suspension of sharing the reflection-based communication element;

an indication of whether resources of the reflection-based communication element that become available due to the suspension of sharing the reflection-based communication element can be used by the second wireless communication node;

an indication of which of the resources of the reflection-based communication element is configured to be temporarily used by the second wireless communication node;

updated sharing configuration parameters associated with the reflection-based communication element; or an updated codebook configured for a reflecting element array of the reflection-based communication element.

11. The wireless communication method of claim 1, wherein an original codebook configured for a reflecting element array of the reflection-based communication element remains during the suspension, and after the reflection-based communication element receives a fourth message indicating the suspension of sharing itself, the reflection-based communication element keeps the original codebook that the first wireless communication node configures for the reflecting element array of the reflection-based communication element and original sharing configuration parameters associated with the reflection-based communication element.

12. The wireless communication method of claim 1, further comprising:

restoring, by the first wireless communication node, the sharing of the reflection-based communication element.

13. The wireless communication method of claim 12, further comprising:

sending, by the first wireless communication node to the second wireless communication node, a fifth message indicating the restoration of sharing the reflection-based communication element.

14. The wireless communication method of claim 13, further comprising:

receiving, by the first wireless communication node from the second wireless communication node, a sixth message acknowledging the fifth message.

15. The wireless communication method of claim 12, further comprising:

sending, by the first wireless communication node or the second wireless communication node to the reflection-based communication element, a seventh message indicating the restoration of sharing the reflection-based communication element.

16. The wireless communication method of claim 15, wherein the seventh message includes at least one of:

an identifier of the wireless communication node which resumes sharing the reflection-based communication element;

updated sharing configuration parameters associated with the reflection-based communication element; or an updated codebook configured for a reflecting element array of the reflection-based communication element.

17. A wireless communication method, comprising:

receiving, by a reflection-based communication element from a first wireless communication node or a second wireless communication node, a first message to suspend sharing of the reflection-based communication element between the first wireless communication node and the second wireless communication node, wherein the reflection-based communication element keeps sharing configuration parameters from the first wireless communication node and the second wireless communication node, and wherein the first message indicates whether resources of the reflection-based communication element that become available due to suspension of sharing the reflection-based communication element can be used by the second wireless communication node.

18. A first wireless communication node, comprising:

at least one processor configured to:

send, via a transmitter to a second wireless communication node, a first message to suspend sharing of a reflection-based communication element between the first wireless communication node and the second wireless communication node, wherein the reflection-based communication element keeps sharing configuration parameters from the first wireless communication node and the second wireless communication node, and wherein the first message indicates whether resources of the reflection-based communication element that become available due to suspension of sharing the reflection-based communication element can be used by the second wireless communication node.

19. A reflection-based communication element, comprising:

at least one processor configured to:

receive, via a receiver from a first wireless communication node or a second wireless communication node, a first message to suspend sharing of the reflection-based communication element between the first wireless communication node and the second wireless communication node, wherein the reflection-based communication element keeps sharing configuration parameters from the first wireless communication node and the second wireless communication node, and wherein the first message indicates whether resources of the reflection-based communication element that become available due to suspension of sharing the reflection-based communication element can be used by the second wireless communication node.

* * * * *